United States Patent
Peng

(12) 
(10) Patent No.: US 11,284,172 B2
(45) Date of Patent: *Mar. 22, 2022

(54) SCALABLE OSPF CONFIGURATION FOR MANAGING OPTICAL NETWORKS

(71) Applicant: Ciena Corporation, Hanover, MD (US)

(72) Inventor: Cheng Peng, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,409

(22) Filed: Feb. 16, 2021

(65) Prior Publication Data
US 2021/0392418 A1 Dec. 16, 2021

Related U.S. Application Data

(63) Continuation of application No. 16/899,658, filed on Jun. 12, 2020, now Pat. No. 10,958,992.

(51) Int. Cl.
*H04Q 11/00* (2006.01)

(52) U.S. Cl.
CPC ..... *H04Q 11/0003* (2013.01); *H04Q 11/0062* (2013.01)

(58) Field of Classification Search
CPC .............. H04Q 11/0003; H04Q 11/0062
USPC ........................................................ 398/58
See application file for complete search history.

(56) References Cited

U.S. PATENT DOCUMENTS

| | | | |
|---|---|---|---|
| 10,958,992 B1* | 3/2021 | Peng | H04Q 11/0062 |
| 2010/0221003 A1* | 9/2010 | Bernstein | H04J 14/0257 398/48 |
| 2015/0043570 A1* | 2/2015 | Filsfils | H04L 41/0813 370/351 |
| 2015/0200838 A1* | 7/2015 | Nadeau | H04B 10/27 398/58 |
| 2016/0173363 A1* | 6/2016 | Torvi | H04L 45/32 370/401 |
| 2016/0269293 A1* | 9/2016 | K A | H04L 45/02 |
| 2017/0093487 A1* | 3/2017 | Grammel | H04B 10/038 |
| 2018/0287873 A1 | 10/2018 | Peng | |
| 2019/0342262 A1 | 11/2019 | Peng | |
| 2020/0044917 A1 | 2/2020 | Peng | |

* cited by examiner

*Primary Examiner* — Dalzid E Singh
(74) *Attorney, Agent, or Firm* — Clements Bernard Baratta; Lawrence A. Baratta, Jr.; Christopher L. Bernard

(57) ABSTRACT

Systems and methods include receiving Open Shortest Path First (OSPF) packets from a plurality of OSPF areas; sending self-generated OSPF packets to the plurality of OSPF areas; and filtering of the received OSPF packets such that received Link State Advertisement (LSA) packets from an OSPF area (are not forwarded to other OSPF areas. In an embodiment, the systems and methods can be used for a scalable OSPF deployment for management of a network, such as an optical network.

20 Claims, 11 Drawing Sheets

SCALABLE OSPF CONFIGURATION FOR MANAGING OPTICAL NETWORKS

CROSS-REFERENCE TO RELATED APPLICATION(S)

The present disclosure is a continuation of U.S. patent application Ser. No. 16/899,658, filed Jun. 12, 2020, the contents of which are incorporated by reference in their entirety.

FIELD OF THE DISCLOSURE

The present disclosure generally relates to networking. More particularly, the present disclosure relates to systems and methods for a scalable Open Shortest Path First (OSPF) configuration for managing optical networks.

BACKGROUND OF THE DISCLOSURE

Open Shortest Path First (OSPF) is a routing protocol for Internet Protocol (IP) networks that uses a Link State Routing (LSR) algorithm and falls into the group of Interior Gateway Protocols (IGPs), operating within a single Autonomous System (AS). OSPF is defined, for example, in RFC 2328 (1998) and RFC 5340 (2008), the contents of which are incorporated herein in their entirety. Also, network elements such as in an optical network are configured to communicate on a Data Communication Network (DCN) for Operations, Administration, Maintenance, and Provisioning (OAM&P) functions. Network operators would like to manage and deploy their optical networks in a cookie-cutter and scalable manner. They would like to use an IGP such as Open Shortest Path First (OSPF) or Intermediate System to Intermediate System (ISIS) to allow communications between the network elements (i.e., logical East-West communications) while using Border Gateway Protocol (BGP) to manage the communications between Network Management Systems (NMSs) and the network elements (i.e., logical North-South communications).

One problem of using the IGP protocols to extend optical networks is that network elements must maintain a small-sized network for simple management or adopt complex network policies to extend the network to a large scale. For example, one can configure the OSPF protocol with a single OSPF area on small networks (e.g., ten or so network elements), or can scale to a large network by breaking the network into many small OSPF autonomous systems and manage the interaction of the OSPF autonomous systems through other routing protocols.

BRIEF SUMMARY OF THE DISCLOSURE

The present disclosure relates to systems and methods for a scalable Open Shortest Path First (OSPF) configuration for managing optical networks. The scalable OSPF configuration is meant for simple, scalable, redundant, and applicable optical network deployment. By simple, there is no need to manage the OSPF area assignment. By scalable, the OSPF network can grow easily. By redundant, all network elements can have redundant access to a Data Communication Network (DCN). By applicable, the deployment is designed for supporting Reconfigurable Optical Add/Drop Multiplexer (ROADMs) sites with a single network element having possible multiple degrees, multiple chassis, multiple shelves, etc. The description herein references OSPF, but those skilled in the art will recognize the same approach applies to ISIS networks. Central to the approach described herein is the concept of an OSPF terminator that is a special kind of OSPF Link State Advertisement (LSA) filtering technique of ab OSPF router, which receives OSPF LSAs from an OSPF neighbor but does not flood the received OSPF LSAs to the other OSPF neighbors. With the approach described herein, it is possible to build a scalable optical network in terms of management plane connectivity.

In an embodiment, a non-transitory computer-readable medium includes instructions stored thereon for programming one or more processors, in a network element configured to operate in an optical network, to perform steps of causing communication to a router connected to a data communication network, for North-South communication; causing communication to a management plane associated with the optical network via one or more interfaces that are each connected to one or more Open Shortest Path First (OSPF) domains, for East-West communication; and implementing an OSPF terminator between the one or more OSPF domains that includes receiving OSPF packets, sending self-generated OSPF packets, and preventing flooding of received OSPF packets, between the one or more OSPF domains. The one or more OSPF domains can each have an arbitrarily selected OSPF area identifier, including where two of the OSPF domains have a same OSPF area identifier.

The OSPF terminator can include, for Database Description (DD) packets, only sending self-generated Link State Advertisements (LSAs). The preventing flooding of the received OSPF packets can include preventing the flooding except for Link State Advertisements (LSAs) that need to be flooded back out a receiving interface. The North-South communication can be via Border Gateway Protocol (BGP) for communication to a Network Management System (NMS). The East-West communication can be via any of an Optical Service Channel (OSC), the data communications network, and via an Internal Local Area Network (ILAN) interface associated with the network element. The network element can be a Reconfigurable Optical Add/Drop Multiplexer (ROADM). The one or more OSPF domains can include a local domain at a site where the ROADM is configured and a domain on an Optical Multiplex Section (OMS) connected to a degree associated with the ROADM, and wherein a network element on the local domain is unreachable to another network element on the domain on the OMS. Every ROADM in the optical network can be configured to implement the OSPF terminator.

In another embodiment, a network element configured to operate in an optical network includes a controller configured to connect to a router connected to a data communication network, for North-South communication; optical line components configured to connect to the optical network and to provide a management plane associated with the optical network via one or more interfaces that are each connected to one or more Open Shortest Path First (OSPF) domains, for East-West communication; and an OSPF terminator configured between the one or more OSPF domains, wherein the OSPF terminator is configured to receive OSPF packets, send self-generated OSPF packets, and prevent flooding of received OSPF packets, between the one or more OSPF domains. The one or more OSPF domains can each have an arbitrarily selected OSPF area identifier, including where two of the OSPF domains have a same OSPF area identifier.

The OSPF terminator can be configured, for Database Description (DD) packets, to only send self-generated Link State Advertisements (LSAs), and the received OSPF packets are not flooded except for Link State Advertisements (LSAs) that need to be flooded back out a receiving interface. The North-South communication can be via Border Gateway Protocol (BGP) for communication to a Network Management System (NMS). The East-West communication can be via any of an Optical Service Channel (OSC), the data communications network, and via an Internal Local Area Network (ILAN) interface associated with the network element.

In a further embodiment, a method, implemented in a network element configured to operate in an optical network includes causing communication to a router connected to a data communication network, for North-South communication; causing communication to a management plane associated with the optical network via one or more interfaces that are each connected to one or more Open Shortest Path First (OSPF) domains, for East-West communication; and implementing an OSPF terminator between the one or more OSPF domains that includes receiving OSPF packets, sending self-generated OSPF packets, and preventing flooding of received OSPF packets, between the one or more OSPF domains. The one or more OSPF domains can each have an arbitrarily selected OSPF area identifier, including where two of the OSPF domains have a same OSPF area identifier.

The OSPF terminator can include, for Database Description (DD) packets, only sending self-generated Link State Advertisements (LSAs), and the preventing flooding of the received OSPF packets includes preventing the flooding except for Link State Advertisements (LSAs) that need to be flooded back out a receiving interface. The North-South communication can be via Border Gateway Protocol (BGP) for communication to a Network Management System (NMS). The East-West communication can be via any of an Optical Service Channel (OSC), the data communications network, and via an Internal Local Area Network (ILAN) interface associated with the network element. The network element can be a Reconfigurable Optical Add/Drop Multiplexer (ROADM).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for a scalable Open Shortest Path First (OSPF) configuration for managing optical networks. The scalable OSPF configuration is meant for simple, scalable, redundant, and applicable optical network deployment. By simple, there is no need to manage the OSPF area assignment. By scalable, the OSPF network can grow easily. By redundant, all network elements can have redundant access to a Data Communication Network (DCN). By applicable, the deployment is designed for supporting Reconfigurable Optical Add/Drop Multiplexer (ROADMs) sites with a single network element having possible multiple degrees, multiple chassis, multiple shelves, etc. The description herein references OSPF, but those skilled in the art will recognize the same approach applies to ISIS networks. Central to the approach described herein is the concept of an OSPF terminator that is a special kind of OSPF LSA filtering technique of an OSPF router which receives OSPF LSAs from an OSPF neighbor but does not flood the received OSPF LSAs to the other OSPF neighbors. With the approach described herein, it is possible to build a scalable optical network in terms of management plane connectivity.

Optical Network Management Plane

Figure 1:
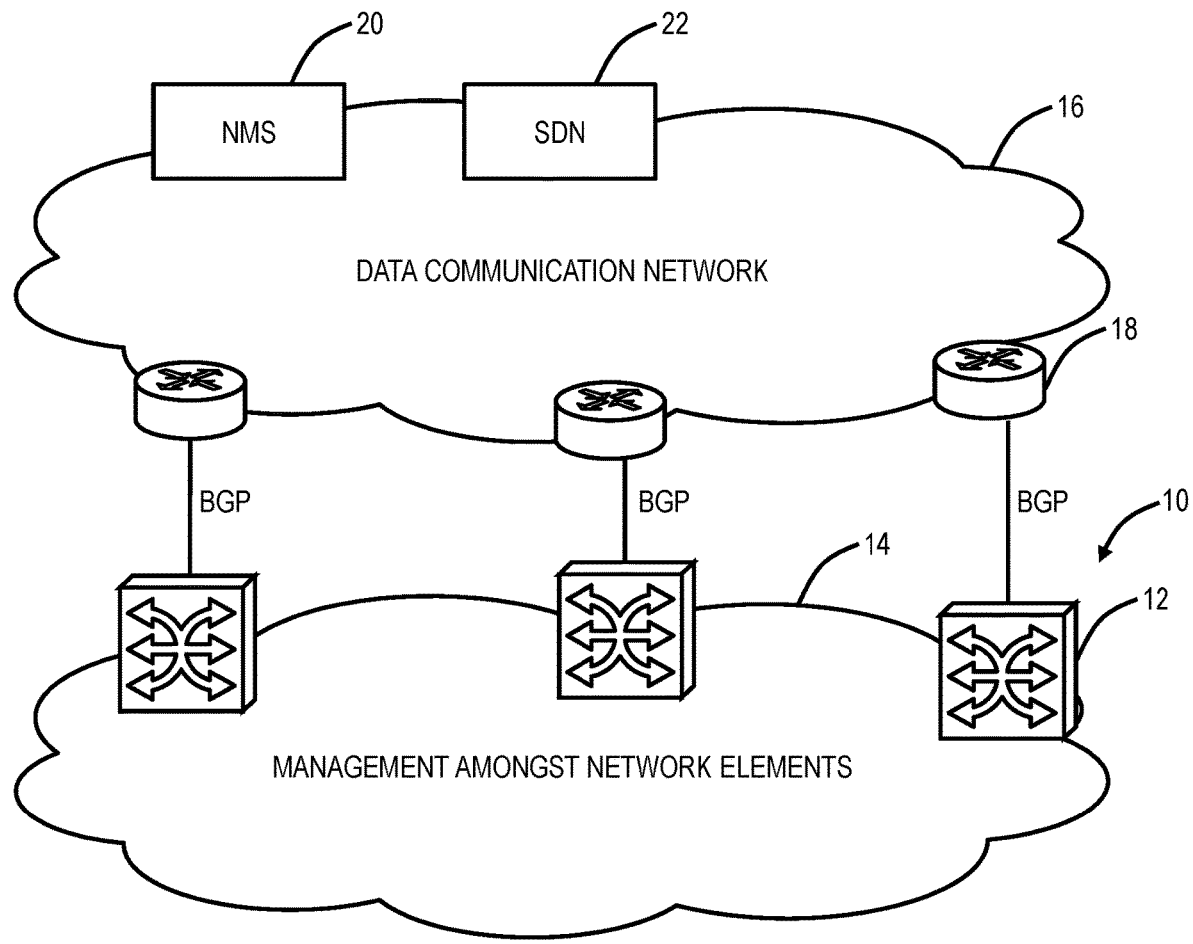
FIG. 1 is a network diagram of a typical optical network deployment in terms of a management plane.

FIG. 1 is a network diagram of a typical optical network 10 deployment in terms of a management plane. The optical network 10 includes network elements 12 that are interconnected to one another optically. The network elements 12 can be Reconfigurable Optical Add/Drop Multiplexer (ROADMs) nodes, Optical Add/Drop Multiplexer (OADM) nodes, Wavelength Division Multiplexed (WDM) nodes, or the like. That is, the network elements 12 are terminal nodes. The physical hardware implementation of the network elements 12 can be chassis with modules, pizza-boxes (i.e., integrated rack mounted units), etc. There is an East-West management plane 14 between the network elements 12. This can include control plane signaling, OAM&P signaling, Optical Transport Network (OTN) signaling, etc. For example, the East-West management plane 14 can be through an in-band signaling mechanism such as the General Communication Channels (GCC) defined by ITU-T G.709 used to carry transmission management and signaling information within OTN elements. Also, the East-West management plane 14 can utilize an Optical Service Channel (OSC) that is configured between the network elements 12 and which terminates at intermediate line amplifier network elements. Note, for illustration purposes, FIG. 1 does not illustrate any intermediate line amplifier network elements between the network elements 12. Again, the East-West management plane 14 can use an IGP such as OSPF or ISIS for communication between the network elements 12.

The network elements 12 are each connected to a data communication network 16, such as via BGP and connections to routers 18. Note, the network elements 12, being OADM, ROADM, etc. sites, are terminal locations, i.e., not remote huts for line amplifier network elements. As such, each network element 12 has data connectivity to the data communication network 16. The network elements 12 communicate to an NMS 20 via the data communication network 16. Optionally, the network elements 12 can also communicate with a Software-Defined Networking (SDN) controller 22 as well. The network elements 12 use BGP to manage the North-South communication to the data communication network 16. Those skilled in the art recognize the terms East-West and North-South are used logically to describe management communications in a logical sense.

Of note, a practical implementation of the optical network 10 could have hundreds or even thousands of network elements, including both the network elements 12 and the line amplifier network elements. As such, the management configuration of the East-West management plane 14 is critical and complex.

Figure 2:
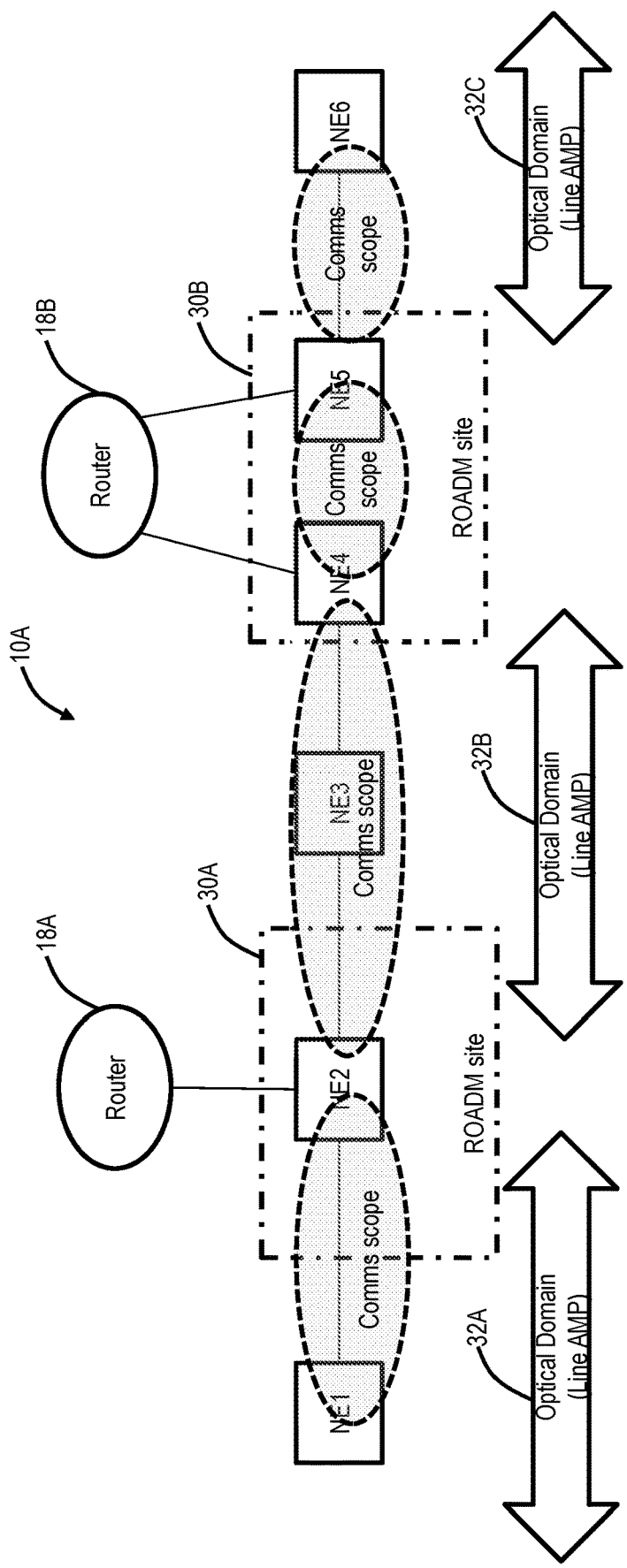
FIG. 2 is a network diagram of an example optical network for illustrating communication requirements in the East-West management plane.

FIG. 2 is a network diagram of an example optical network 10A for illustrating communication requirements in the East-West management plane 14. In this example network, the optical network 10A includes six network elements NE1, NE2, NE3, NE4, NE5, NE6 and two example ROADM sites 30A, 30B. The network element NE2 is a ROADM network element 12 at the ROADM site 30A, and the network elements NE4, NE5 are ROADM network elements 12 at the ROADM site 30B. The network elements NE1, NE3, NE6 can be intermediate line amplifier network elements connected to the ROADM sites 30A, 30B by fiber optic cables.

For the management plane 14, the optical network 10A includes the ROADM sites 30A, 30B and domains 32A, 32B, 32C. The domains 32A, 32B, 32C extend from the ROADM sites 30A, 30B, and include the intermediate line amplifier network elements. For example, a domain 32 can be an Optical Multiplex Section (OMS), which is an all-optical section between OADM/ROADM sites 30A, 30B. The optical network 10A requires data communications between the network elements of a single site 30A, 30B and between the network elements of a single domain 32. For example, the NE2, NE3 and NE4 are required to communicate. The network elements NE4, NE5 are required to communicate. However, the network element NE3 does not need to communicate with the network element NE5. The communication requirement for the optical network 10A is that the network elements within a ROADM site are required to communicate and the network elements within a domain are required to communicate.

Of note, the optical network 10A has very few network elements for illustration purposes. Those skilled in the art recognize a practical network implementation can have tens, hundreds, or even thousands of network elements, tens, hundreds, or even thousands of domains 32, etc.

Conventional Management Plane Approaches

Figure 3:
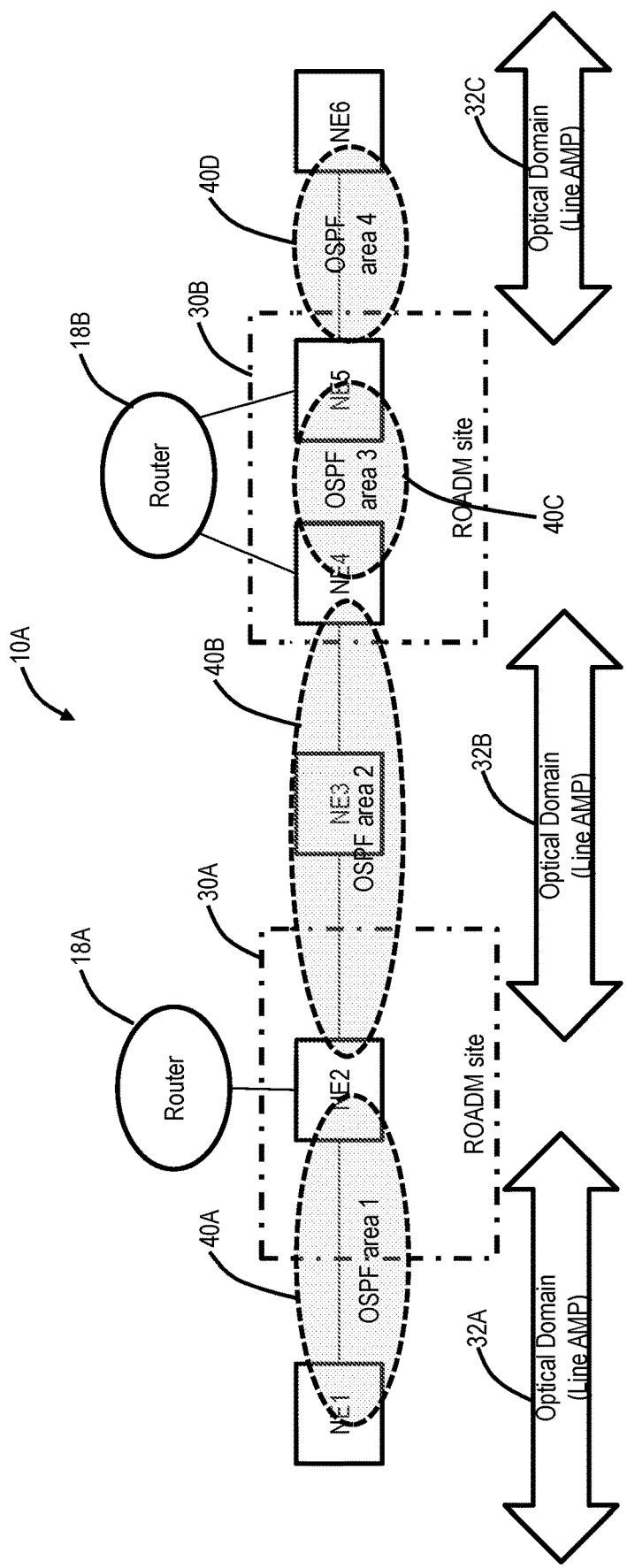
FIG. 3 is a network diagram of the optical network of FIG. 2 with multiple non-backbone OSPF areas in a non-backbone OSPF network.
Figure 4:
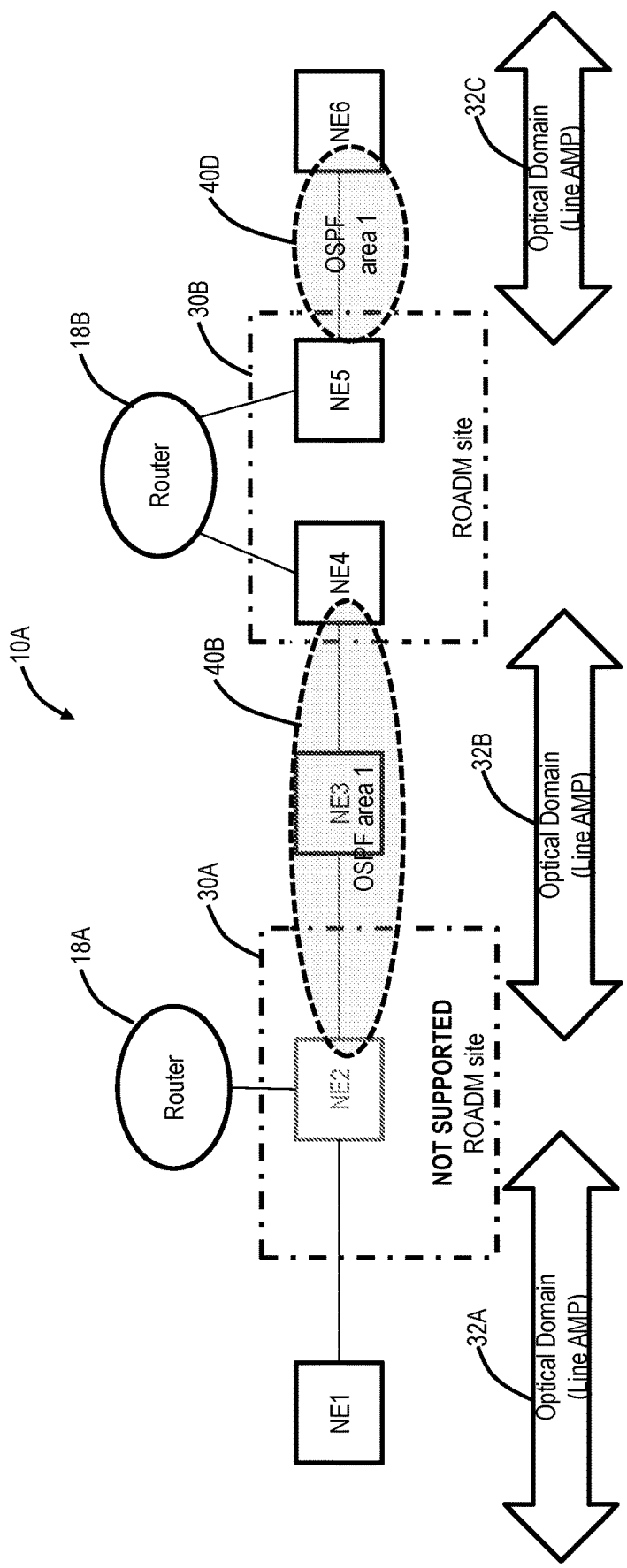
FIG. 4 is a network diagram of the optical network of FIG. 2 with a single OSPF area but one direction per ROADM network element.
Figure 5:
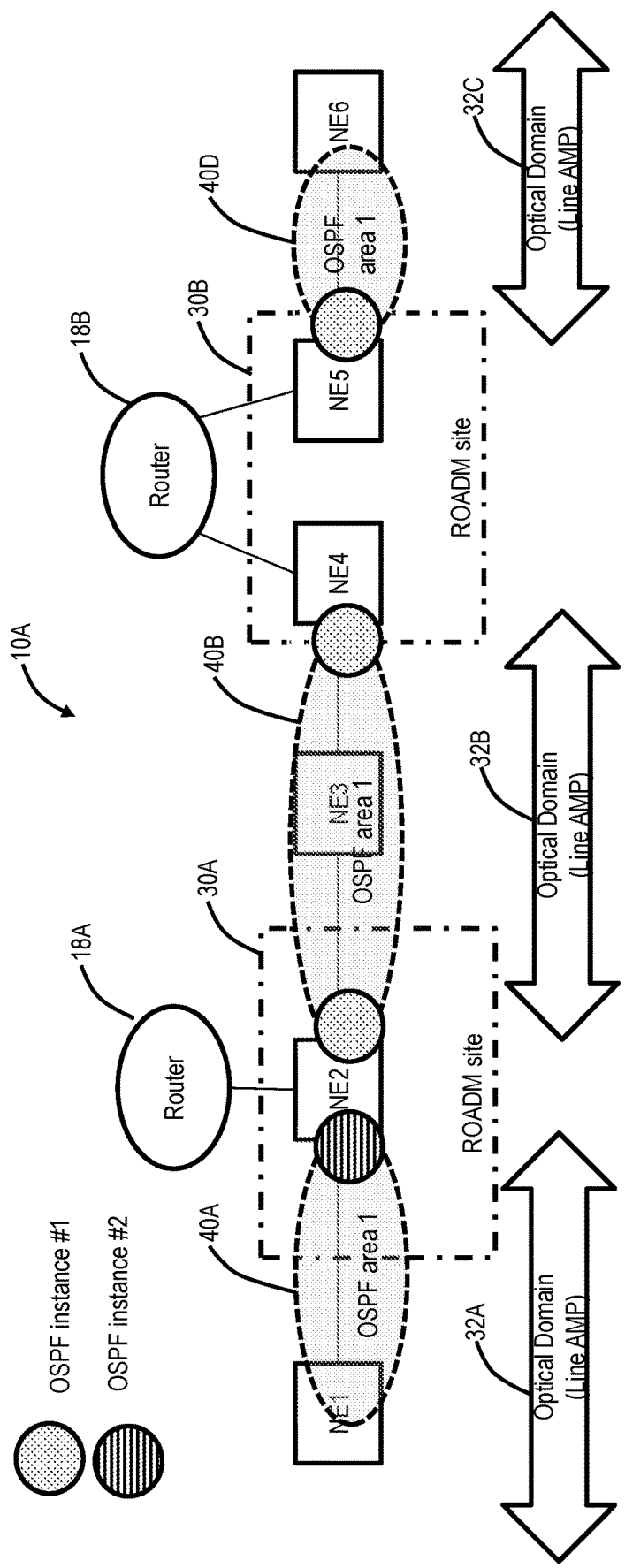
FIG. 5 is a network diagram of the optical network of FIG. 2 with multiple OSPF routing instances.
Figure 6:
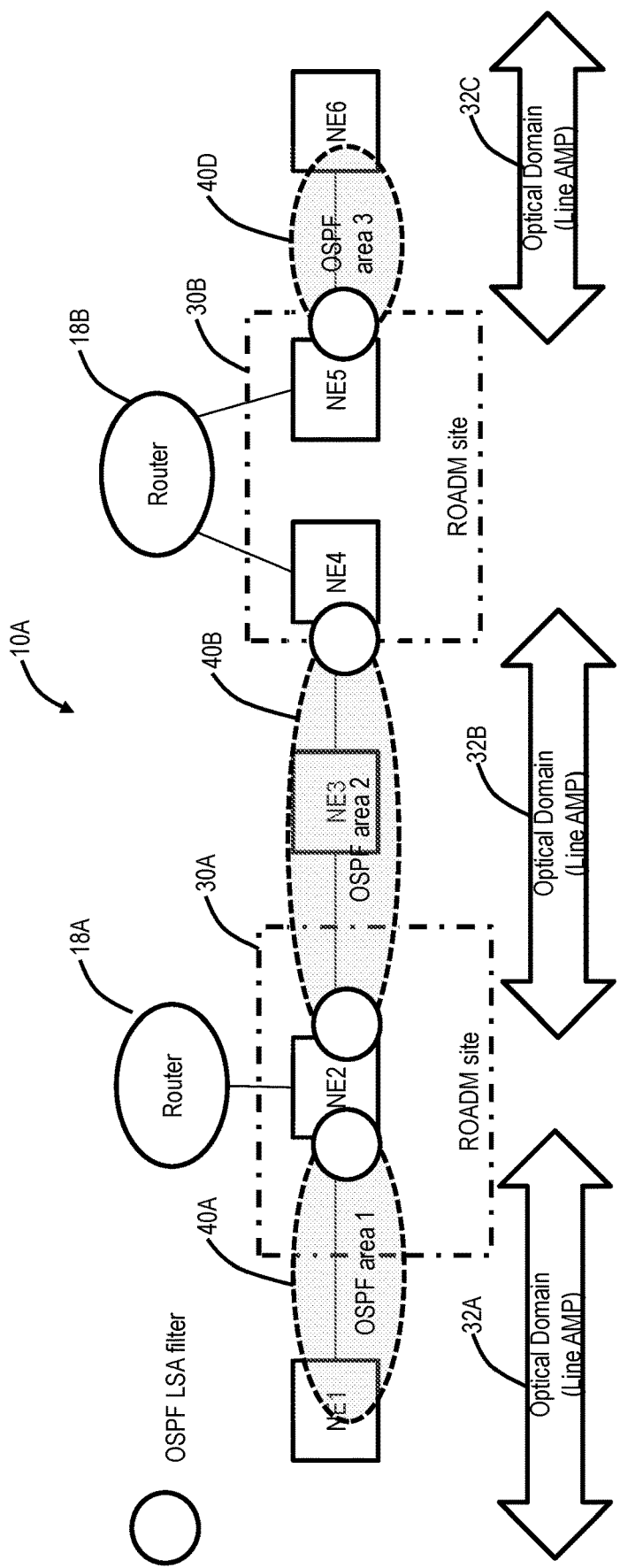
FIG. 6 is a network diagram of the optical network of FIG. 2 with an OSPF filter to control the LSA database.

The following FIGS. 3-6 illustrate example approaches used today to scale the management plane 14 for the optical network 10. Namely FIG. 3 is a network diagram of the optical network 10A with multiple non-backbone OSPF areas in a non-backbone OSPF network. FIG. 4 is a network diagram of the optical network 10A with a single OSPF area but one direction per ROADM network element. FIG. 5 is a network diagram of the optical network 10A with multiple OSPF routing instances. FIG. 6 is a network diagram of the optical network 10A with an OSPF filter to control the LSA database.

In FIG. 3, there is no OSPF backbone area configured in the optical network 10A, one unique non-backbone area 40A, 40B, 40D per domain, and one unique non-backbone area 40C per site. The loopback address of the network elements that participate in multiple OSPF areas is redistributed to OSPF. The technique is to assign different OSPF non-backbone area IDs to different routing domain (e.g., each area 40 has a different OSPF area ID). Since the OSPF routes in one area cannot be advertised to another due to the lack of backbone, an OSPF autonomous system can be divided into multiple routing domains.

Disadvantageously, the number of non-backbone areas will increase with network growth, which causes difficulties in managing the OSPF area ID. The route redistribution will generate OSPF type-5 LSAs, the number of which is proportional to the number of the OSPF areas. Therefore, the approach cannot grow the optical network 10A infinitely. When the optical network 10A becomes large, the overhead of managing the OSPF area ID becomes a burden. Another problem is that the loopback IP of the ROADM network elements can only be advertised to one OSPF area; therefore, the address must be redistributed to other OSPF areas. The OSPF then generates type-3 LSAs, which has a global flooding scope. Therefore, the number of OSPF type-3 LSAs increases in terms of the size of the network, which prevents the optical network 10A from scaling.

In FIG. 4, a single OSPF area ID is used on each domain 32 with one ROADM network element managing one direction. There is OSPF communication with the sites 30A, 30B. However, the communication within the site 30B is provided by BGP. Since the OSPF routing information is isolated by BGP, each areas 40B, 40D in FIG. 4 become a separate OSPF autonomous system. Naturally, the network elements in the same OSPF autonomous system can communicate with each other. This approach cannot support a single ROADM network element per site, 30A. This approach is not economical to deploy the optical network 10A because, in a multi-degree ROADM network element, each direction requires a separate ROADM network element.

In FIG. 5, multiple OSPF instances are configured on the ROADM network element, one per optical direction. There is OSPF communication with the sites 30A, 30B. This approach configures multiple OSPF routing instances on the ROADM network element, one for each direction. Since the routing information learned by each routing instance is isolated to that routing instance, each area 40A, 40B, 40D in FIG. 5 becomes a separate OSPF autonomous system. Compared to the approach in FIG. 4, this approach can support a single ROADM network element per site 30A. This approach requires putting multiple OSPF routing instances on a network element with multiple degrees, requiring careful network planning and consuming more computation and memory resources.

In FIG. 6, OSPF filtering is used to filter out certain types of LSAs so that the LSA database of the OSPF is reduced. Therefore, the system can handle larger networks. The OSPF filtering is used to control the number of LSAs flooding in the optical network 10A. The OSPF LSA filter can be used to determine which type of LSAs can be flooded or accepted on a network element. The OSPF route filter can be used to filter out the LSA associated with a route. The OSPF area filter can be used to filter out routes from a specified area. The OSPF filter is LSA type-based filter. For a large network, the route redistribution will generate a significant volume of type-5 LSAs, which are hard to filter out. This is used to reduce the number of LSAs to achieve OSPF scalability. One problem is that the existing OSPF filtering is based on LSA type but not the topology. Therefore, a lot of irrelevant LSAs cannot be filtered out. For example, if a device requires one type-5 LSA for DCN access, it must keep all type-5 LSAs. Hence, the ability to scale the optical network 10A is limited. If the users want to scale the optical network 10A, they must define a set of filtering rules tailored to each device, which adds the network configuration complex and management cost.

Another approach is to use an OSPF stub area, and route summarization to reduce the number of LSAs to gain network scalability. OSPF stub area (RFC2328 and RFC3101) is an area in which only one OSPF router connecting to the standard OSPF area. The router can then issue the default route to the stub area shielding the external LSAs. Both totally stubby area and Not-So-Stubby Area (NSSA) follow the same rule above. The only difference is that the NSSA allows an external route to be redistributed into the stub area. The stub areas do not satisfy customer's requirements because it needs to manage the OSPF area assignment and cannot support redundancy. RFC3137 defines the behavior that a router can originate an LSA with the maximal metric so that the other routers avoid using the transit path via the router to forward traffic. The OSPF Stub Router Advertisement solution does not satisfy customer's requirements because it can only be used to direct the transit traffic, but it cannot reduce the number of LSAs within the network. Therefore, the number of LSAs will increase in terms of the size of networks.

OSPF Terminator

Figure 7:
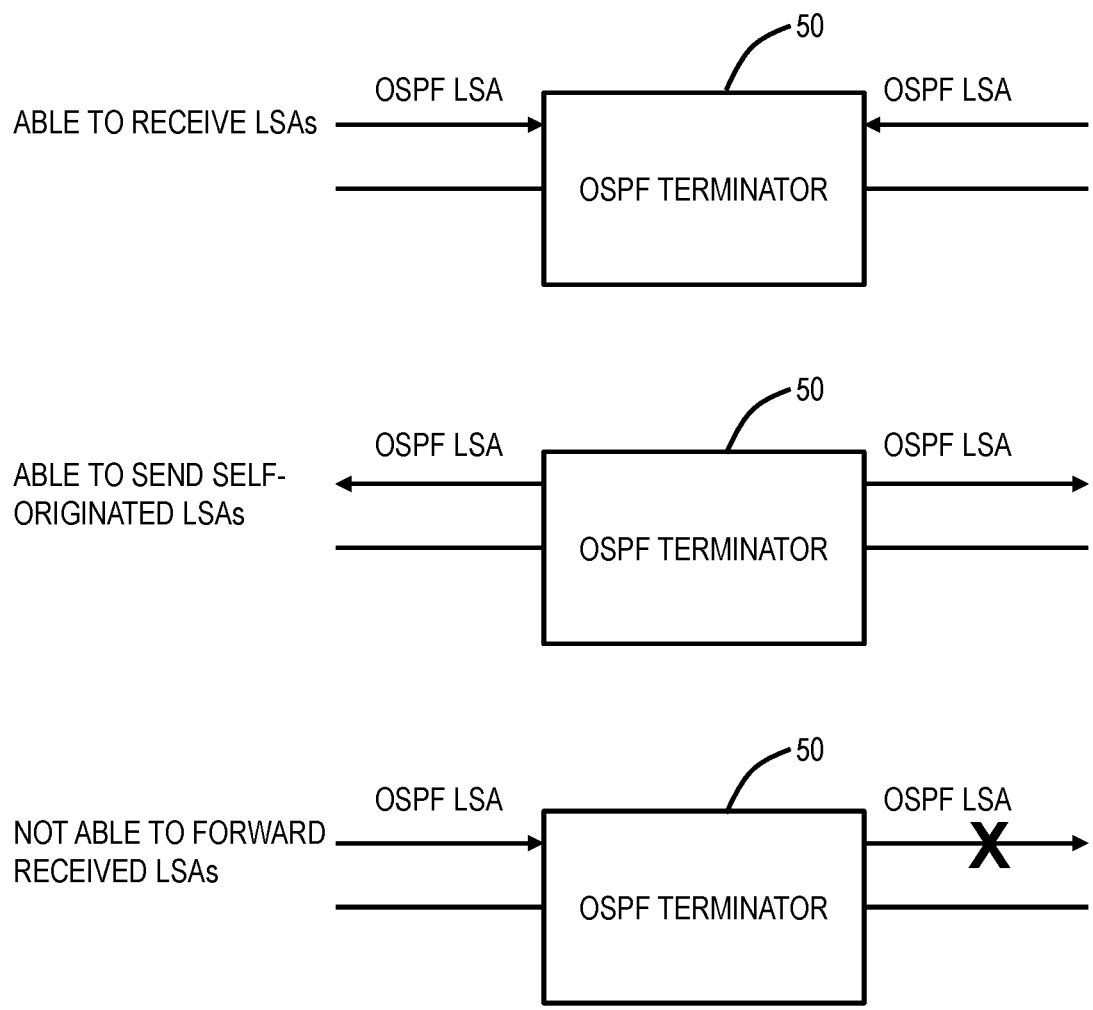
FIG. 7 is a block diagram of the functionality of an OSPF terminator.

Again, the aforementioned approaches address some aspects of scalability. However, there is still a need for a simple, scalable, redundant, and applicable approach. The present disclosure includes an OSPF terminator that implements a special type of OSPF LSA filtering that receives OSPF LSAs from an OSPF neighbor but does not flood the received OSPF LSAs to the other OSPF neighbors. FIG. 7 is a block diagram of the functionality of an OSPF terminator 50. As noted in FIG. 7, the OSPF terminator is configured to receive LSAs, to send self-originating LSAs, but not to forward received LSAs. That is, the OSPF terminator 50 is a special OSPF router that can receive OSPF packets, send self-generated OSPF packets, but never flood its received OSPF packets to its OSPF neighbors.

Specifically, the OSPF terminator 50 is based on the modification of the OSPF router behavior defined in RFC 2328. Relative to Section 7.2 of RFC 2328, when the OSPF router attempts to send Database Description (DD) packets, only the self-originated LSAs are attached to the packet. As a comparison, the standard requires attachment of all the LSAs to the DD packets. Next, this includes modification of the Bullet 5(b) of Section 13 of the RFC 2328, namely the OSPF terminator 50 does not flood newly received LSAs out any subnet of the router's interfaces, except for the cases the LSAs need to be flooded back out the receiving interface. As a comparison, the standard requires to flood the LSAs out some subnet of the router's interfaces.

Figure 8:
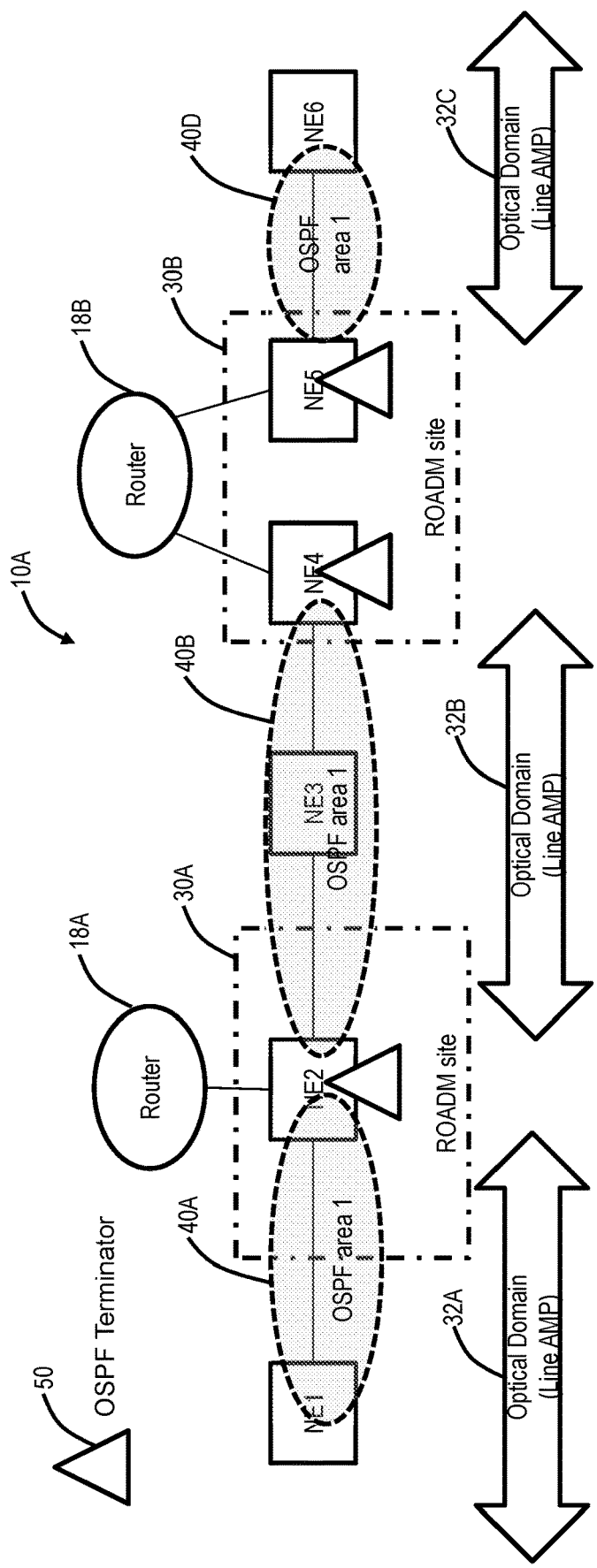
FIG. 8 is a network diagram of the optical network of FIG. 2 with OSPF terminators used therein for a simple, scalable, redundant, and applicable approach to managing the optical network of FIG. 2.

FIG. 8 is a network diagram of the optical network 10A with OSPF terminators 50 used therein for a simple, scalable, redundant, and applicable approach to managing the optical network 10A. The OSPF terminator 50 operates as described above. The configuration rules for the OSPF terminators 50 in the optical network 10A are as follows. The OSPF terminator 50 functionality is configured on all ROADM network elements with degrees, namely the network elements NE2, NE4, NE5. The optical network 10A includes a single OSPF area ID across the entire network. Here, the domains 40A, 40B, 40D all have the same OSPF area ID. Again, functionally, the OSPF traffic will be stopped at the OSPF terminator 50, and the LSA database is reduced. This leads to a cookie-cutter approach—the same OSPF configuration can be replicated to each site 30 and domain 32. The communication network, i.e., the management plane 14, can grow without limitation. Also, this approach supports a single ROADM network element and multiple ROADM network element configurations.

Figure 9:
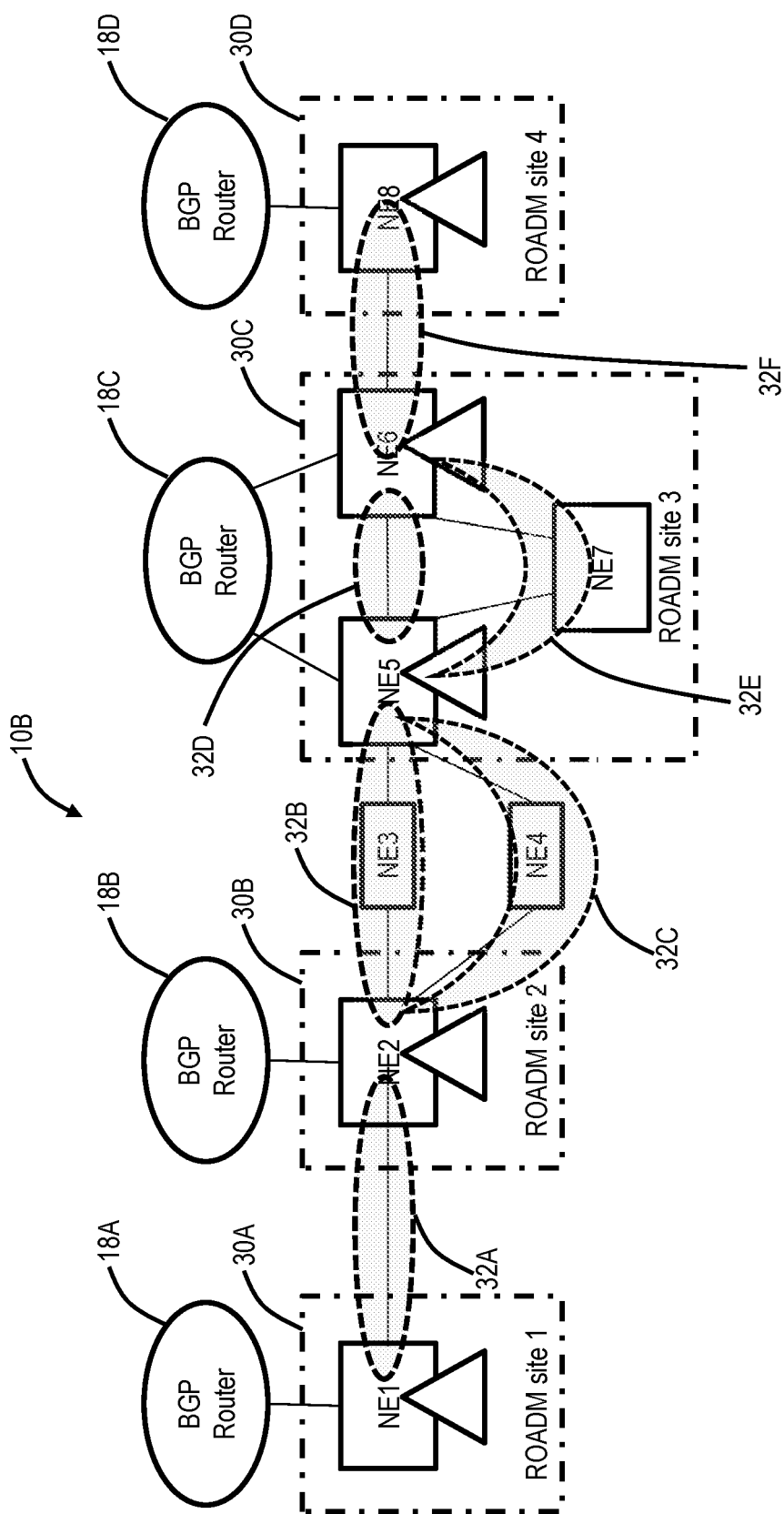
FIG. 9 is a network diagram of an optical network with OSPF terminators used therein illustrating example operations.

FIG. 9 is a network diagram of an optical network 10B with OSPF terminators 50 used therein illustrating example operations. The optical network 10B includes four ROADM sites 30A, 30B, 30C, 30D. The ROADM sites 30A, 30D include a single ROADM network element NE1, NE8, are single degree sites, and the network elements NE1, NE8 connect to BGP routers 18A, 18D, respectively. The ROADM site 30B has a single ROADM network element NE2, but it is a three-degree site, and the network element NE2 is connected to a BGP router 18B. Finally, the ROADM site 30C has three ROADM network elements NE5, NE6, NE7, with each interconnected to one another. The network element NE5 is a two-degree configuration, the network element NE6 is a single degree, and each connects to a BGP router 18C. For example, the network element NE7 can a Add/Drop or pre-combiner network element without degrees. The connections between the network elements NE1, NE2, NE5, NE6, NE8 and BGP routers are Local Area Network (LAN) connections. Also, the optical network 10B includes two line amplifier network elements NE3, NE4 between the network elements NE2, NE5. FIG. 9 is presented to illustrate how the OSPF terminators 50 can be used to realize a scalable OSPF-based optical network in a cookie-cutter manner.

The North-South communication channel is established by the BGP protocol, while the East-West communication channel is established by the OSPF protocol. Different from traditional OSPF networks described herein; the East-West OSPF networks are operated on a single OSPF area. The area ID is arbitrarily chosen. The network elements within a ROADM site can be connected via ILAN interfaces (the ROADM site 30C) or via DCN routers (the ROADM site 30B). When a network element, such as the network elements NE1, NE2, NE5, NE6, NE8, is a network element with degrees which connects, via OSC interfaces, to another ROADM site 30, these network elements must connect to the DCN BGP router 18 and the OSPF terminator 50 has to be enabled. For example, at the ROADM site 30C, the network elements NE5, NE6 must connect to the BGP router 18C and have the OSPF terminator 50 enabled. Conversely, if a network element is not a network element with degrees and does not have connections to another ROADM site, no OSPF terminator 50 is required, e.g., the NE7 at the ROADM site 30C. Also, the network elements NE1, NE2, NE8 are configured with connections to the BGP routers 18A, 18B, 18D, and with the OSPF terminators 50.

The OSPF terminator separates the single OSPF AS into six independent OSPF routing domains 32A-32F. The devices within the same OSPF routing domain 32 have IP reachability, while those in different domains 32 do not. For example, the network elements NE2, NE3 and NE5 are connected via OSC interfaces and within the same routing domain 32B so they can communicate with each other. The network elements NE3, NE4 cannot reach each other because they are in different domains 32B, 32C. The OSPF terminator 50 on the network elements NE2, NE5 prevents routes from being leaked between the domains 32.

The deployment method using the OSPF terminators satisfies the goals outlined herein—simple, scalable, redundant, and applicable. For simple, a network operator does not need to plan OSPF networks; an arbitrary OSPF area ID can be assigned to every network element (these can be the same, different, it does not matter). Arbitrary means just that—it can be any value. For scalable, the deployment can grow the optical network 10 infinitely because the OSPF terminators 50 separate a big OSPF autonomous system into independent OSPF routing domains 32. No OSPF traffic is leaked between these routing domains 32. Therefore, the size of the OSPF Link State (LS) database and IP routing table does not grow in terms of the size of the optical network 10.

For redundant, each network element can be accessed by a Gateway Network Element (GNE) with the OSPF terminator 50 enabled. That is, every OADM network element 12 with degrees is a GNE, connected to the router 18. For applicable, this deployment approach supports a ROADM site with a single network element and a ROADM site with multiple network elements.

The OSPF terminator 50 satisfies all the network planning requirements described herein to make the user's network design simpler and scalable. The OSPF terminator 50 terminates the OSPF LSAs at the ROADM network element 12 so that the OSPF area planning is not necessary, and the number of LSAs in the optical network 10 is restricted between the OSPF terminators 50.

Since this approach does not change the OSPF LSA propagation between two OSPF terminators 50, the network elements in between always have redundant access (East and West), which satisfies the redundancy requirement.

Since the OSPF terminator 50 terminates all OSPF LSAs, it does not leak LSAs from one area to another, even on a single network element. Therefore, a ROADM site with multiple degrees (directions), the LSAs are constraint within that direction. So, the optical network 10 can scale even under this configuration.

Advantageously, the present disclosure does not require network operators to manage OSPF area ID, does not require multiple OSPF instances, does not require additional IGP protocols, and the OSPF terminator 50 can filter out all irrelevant LSAs to gain high network scalability. Thus, the present disclosure can be used to quickly and efficiently deploy the optical network 10 from the perspective of the management plane 14, in a cookie-cutter based network deployment.

Example Network Element/Node

Figure 10:
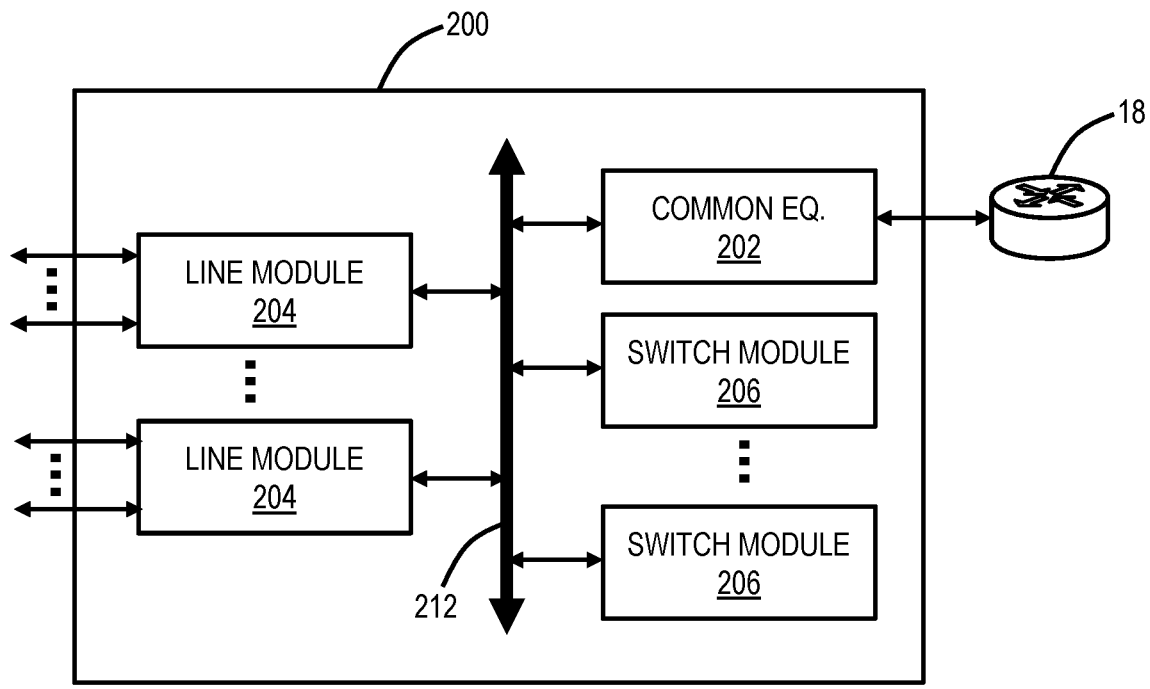
FIG. 10 is a block diagram of an example network element for use with the scalable OSPF systems and methods described herein.

FIG. 10 is a block diagram of an example network element 12 for use with the scalable OSPF systems and methods described herein. In an embodiment, the network element 12 can be a device that may consolidate the functionality of a Multi-Service Provisioning Platform (MSPP), Digital Cross-Connect (DCS), Ethernet and/or Optical Transport Network (OTN) switch, Wave Division Multiplexed (WDM)/DWDM platform, Packet Optical Transport System (POTS), etc. into a single, high-capacity intelligent switching system providing Layer 0, 1, 2, and/or 3 consolidation. In another embodiment, the network element 12 can be any of a WDM/DWDM terminal, an OADM, a ROADM, etc. That is, the network element 12 can be any digital and/or optical system with ingress and egress digital and/or optical signals and switching of channels, timeslots, tributary units, wavelengths, etc.

Figure 11:
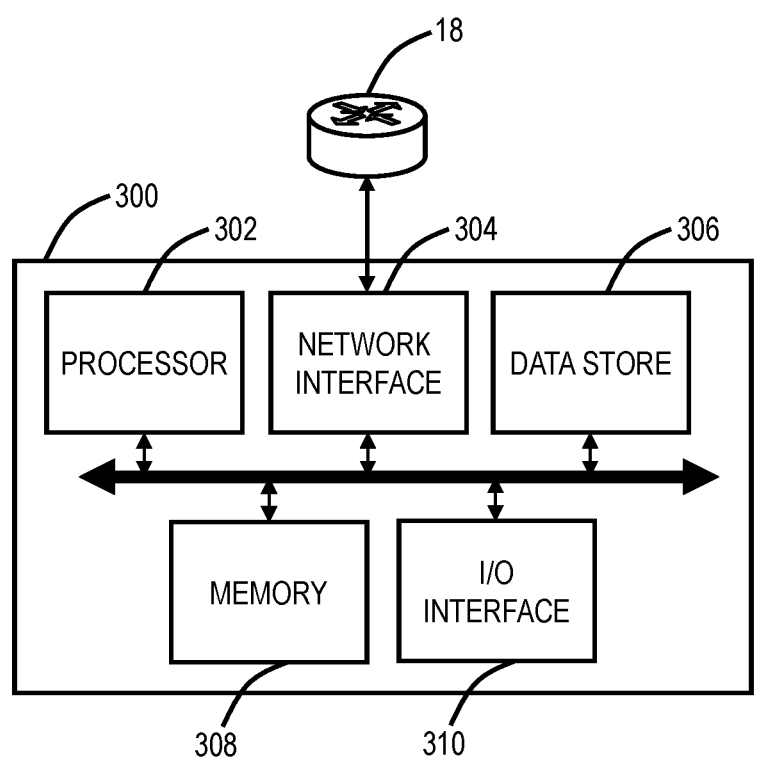
FIG. 11 is a block diagram of a controller that can connect to a router and implement the OSPF terminator of FIG. 7.

In an embodiment, the network element 200 includes common equipment 202, one or more line modules 204, and one or more switch modules 206. The common equipment 202 can include power; a control module such as a controller 300, as illustrated in FIG. 11; OAM&P access; user interface ports; and the like. The common equipment 202 can connect to the management plane 14 through the router 18. Additionally, the common equipment 202 can include a controller, a shelf processor, a control plane processor, etc. such as a controller 300 illustrated in FIG. 3. The network element 12 can include an interface 212 for communicatively coupling the common equipment 202, the line modules 204, and the switch modules 206 to one another. For example, the interface 212 can be a backplane, midplane, a bus, optical and/or electrical connectors, or the like. The line modules 204 are configured to provide ingress and egress to the switch modules 206 and to external connections on the links to/from the network element 12. In an embodiment, the line modules 204 can form ingress and egress switches with the switch modules 206 as center stage switches for a three-stage switch, e.g., a three-stage Clos switch. Other configurations and/or architectures are also contemplated.

Further, the line modules 204 can include a plurality of optical connections per module, and each module may include a flexible rate support for any type of connection. The line modules 204 can include WDM interfaces, short-reach interfaces, pluggable modules, and the like, and can connect to other line modules 204 on remote network elements, end clients, edge routers, and the like, e.g., forming connections on the links in the optical network 10. From a logical perspective, the line modules 204 provide ingress and egress ports to the network element 12, and each line module 204 can include one or more physical ports. The switch modules 206 are configured to switch channels, timeslots, tributary units, packets, etc. between the line modules 204. For example, the switch modules 206 can provide wavelength granularity (Layer 0 switching); OTN granularity; Ethernet granularity; and the like.

The network element 12 can include a chassis (shelf) where the equipment 202 and the modules 204, 206 are realized as cards, modules, circuit packs, blades, etc. As described herein, the term module is used to represent all of these hardware devices. Here, a module is physically inserted in the chassis and connected to the interface 212. The network element 12 is illustrated with the line modules 204 and the switch modules, as well as the controller 300. Other types of modules are also contemplated. Further, there can be a variety of different types of line modules 204 and switch modules 206.

Also, those of ordinary skill in the art will recognize the network element 12 can include other components which are omitted for illustration purposes, and that the systems and methods described herein are contemplated for use with a plurality of different network elements with the network element 12 presented as an example type of network element. For example, in another embodiment, the network element 12 may not include the switch modules 206, but rather have the corresponding functionality in the line modules 204 (or some equivalent) in a distributed fashion. Also, the network element 12 may omit the switch modules 206 and that functionality, such as in a WDM network element, ROADM, OADM, etc. For the network element 12, other architectures providing ingress, egress, and switching are also contemplated for the systems and methods described herein. In a further embodiment, the chassis and modules may be a single integrated unit, namely a rack-mounted shelf where the functionality of the modules 204, 206 is built-in, i.e., a "pizza-box" configuration.

Note, the network element can be configured as a single "shelf" or multiple "shelves." Those of ordinary skill in the art will recognize the term shelf can refer to a chassis, a rack-mounted unit (pizza box), etc. A network element, i.e., a node, is a single entity from a network management, OAM&P, etc. perspective. Here, a network element may include one or more shelves, with each shelf having its own controller 300.

Example Controller

FIG. 11 is a block diagram of a controller 300, which can connect to the router 18 and implement the OSPF terminator 50 described herein. The controller 300 can be part of the common equipment, such as common equipment 202 in the network element 12, or a stand-alone device communicatively coupled to the network element 12 via the data communication network 16. Further, the controller 300 can be referred to in implementations as a control module, a shelf controller, a shelf processor, a system controller, etc. As described herein, the controller 300 is meant to cover any processing device that is used to control the operation of a network element 12, including connectivity to the router 18 for the management plane 14. Specifically, the controller 300 can implement the OSPF terminator 50 described herein. The controller 300 can include a processor 302, which is a hardware device for executing software instructions. The processor 302 can be any custom made or commercially available processor, a central processing unit (CPU), an auxiliary processor among several processors associated with the controller 300, a semiconductor-based microprocessor (in the form of a microchip or chipset), or generally any device for executing software instructions. When the controller 300 is in operation, the processor 302 is configured to execute software stored within the memory, to communicate data to and from the memory, and to generally control operations of the controller 300 pursuant to the software instructions. The controller 300 can also include a network interface 304, a data store 306, memory 308, an I/O interface 310, and the like, all of which are communicatively coupled to one another and to the processor 302.

The network interface 304 can be used to enable the controller 300 to communicate with the router 18 in the data communication network 16, such as to communicate North-South as to the NMS 20, to the SDN controller 22, and the like. Further, the common equipment 202 may also include an OSC module for East-West communication, and the line modules 204 can also provide East-West communication such as via overhead. The network interface 304 can include, for example, an Ethernet module. The network interface 304 can include address, control, and/or data connections to enable appropriate communications on the network. The data store 306 can be used to store data, such as control plane information, provisioning data, OAM&P data, etc. The data store 306 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 306 can incorporate electronic, magnetic, optical, and/or other types of storage media. The memory 308 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 308 may incorporate electronic, magnetic, optical, and/or other types of storage media. Note that the memory 308 can have a distributed architecture, where various components are situated remotely from one another, but may be accessed by the processor 302. The I/O interface 310 includes components for the controller 300 to communicate with other devices. Further, the I/O interface 310 includes components for the controller 300 to communicate with the other nodes, such as using overhead associated with OTN signals, an Optical Service Channel (OSC), etc.

Again, the network element 12 performs North-South communication with the router 18 to the data communication network 16. This functionality may be performed by the network interface 304. The network element 12 also performs East-West communication with other network elements via the management plane 14. This functionality may be performed by the controller 300, by the common equipment 202, such as an OSC module, by the line modules 204, such as via overhead, by the network interface 304, etc. The OSPF terminator 50 functionality is provided for the East-West communication. Thus, the OSPF terminator 50 functionality may be performed by any of the controller 300, the common equipment 202 such as an OSC module, by the line modules 204, such as via overhead, by the network interface 304, etc., individually or in combination with one another. That is, the present disclosure is presenting the network element 12 in FIG. 10 and the controller 300 in FIG. 11 for illustration purposes. Those skilled in the art will recognize various physical implementations are possible and contemplated herein for the East-West communication in the management plane 14.

Scalable OSPF Process

Figure 12:
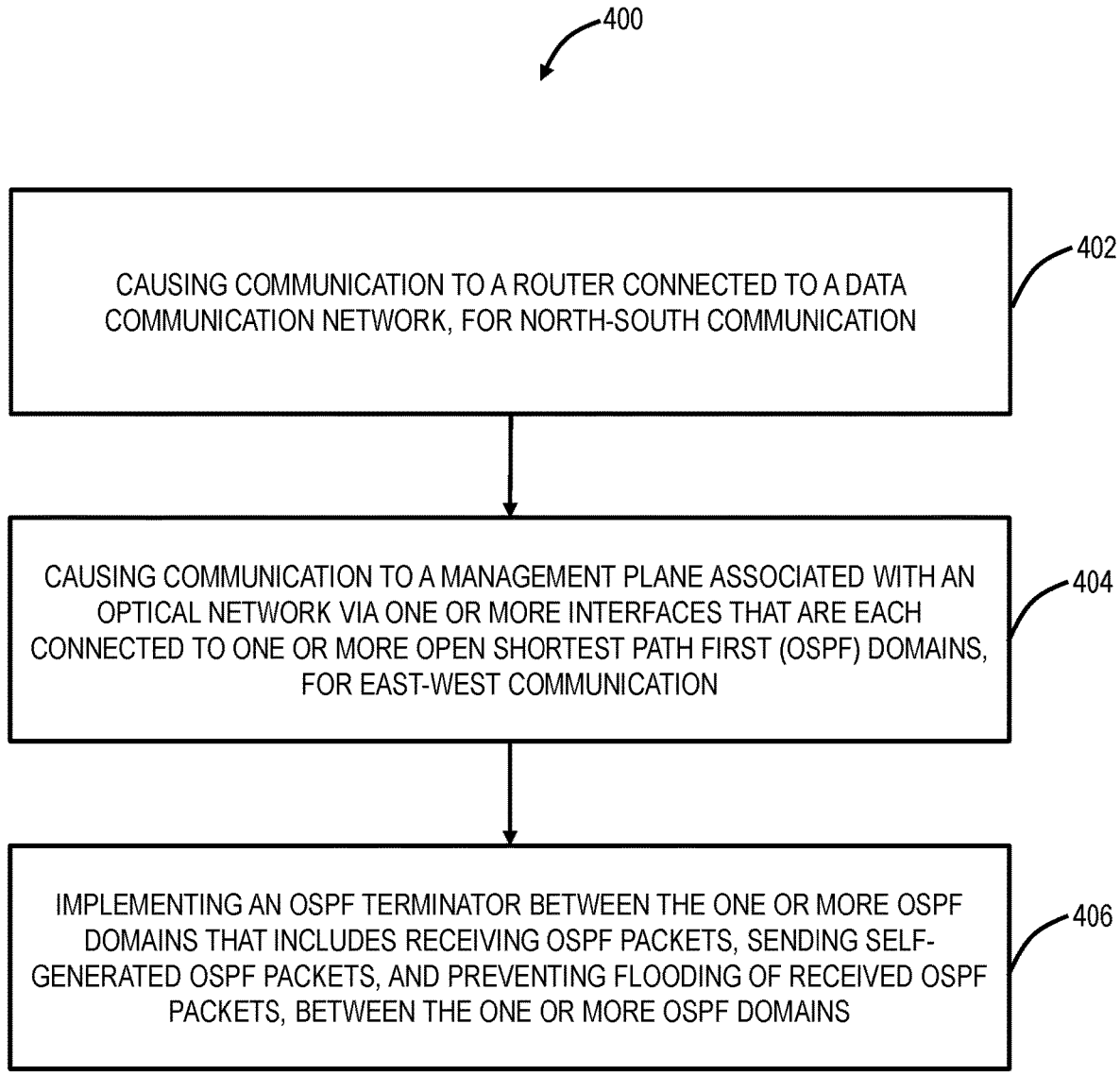
FIG. 12 is a flowchart of a scalable Open Shortest Path First (OSPF) process, implemented in a network element configured to operate in an optical network.

FIG. 12 is a flowchart of a scalable Open Shortest Path First (OSPF) process 400, implemented in a network element 12 configured to operate in the optical network 10. The process 400 can be a computer-implemented method, embodied in a non-transitory computer-readable medium having instructions stored thereon for programming one or more processors, and implemented in the network element 12.

The scalable OSPF process 400 includes causing communication to a router connected to a data communication network, for North-South communication (step 402); causing communication to a management plane associated with the optical network via one or more interfaces that are each connected to one or more Open Shortest Path First (OSPF) domains, for East-West communication (step 404); and implementing an OSPF terminator between the one or more OSPF domains that includes receiving OSPF packets, sending self-generated OSPF packets, and preventing flooding of received OSPF packets, between the one or more OSPF domains (step 406).

The one or more OSPF domains can each have an arbitrarily selected OSPF area identifier, including where two of the OSPF domains have a same OSPF area identifier. That is, the same OSPF area identifier can be used in every domain. Also, it could be a random value. The key point is there is no need to manage separate domains because of the OSPF terminator.

The OSPF terminator can include, for Database Description (DD) packets, only sending self-generated Link State Advertisements (LSAs). The preventing flooding of the received OSPF packets can include preventing the flooding except for Link State Advertisements (LSAs) that need to be flooded back out a receiving interface.

The North-South communication can be via Border Gateway Protocol (BGP) for communication to a Network Management System (NMS). The East-West communication can be via any of an Optical Service Channel (OSC), the data communications network, and via an Internal Local Area Network (ILAN) interface associated with the network element.

The network element can be a Reconfigurable Optical Add/Drop Multiplexer (ROADM). The one or more OSPF domains can include a local domain at a site where the ROADM is configured, and a domain on an Optical Multiplex Section (OMS) connected to a degree associated with the ROADM, and wherein a network element on the local domain is unreachable to another network element on the domain on the OMS. Every ROADM in the optical network is configured to implement the OSPF terminator.

In another embodiment, a network element configured to operate in an optical network includes a controller configured to connect to a router connected to a data communication network, for North-South communication; optical line components configured to connect to the optical network and to provide a management plane associated with the optical network via one or more interfaces that are each connected to one or more Open Shortest Path First (OSPF) domains, for East-West communication; and an OSPF terminator configured between the one or more OSPF domains that includes receiving OSPF packets, sending self-generated OSPF packets, and preventing flooding of received OSPF packets, between the one or more OSPF domains.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments. Specifically, the OSPF terminator 50 described herein can be implemented as instructions executable by a processor or device, as a processor or device configured to perform the associated steps, as a circuit including software and/or firmware, and the like.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions which, when executed on at least one processor, cause the at least one processor to carry the steps of:
receiving Open Shortest Path First (OSPF) packets from a plurality of OSPF areas;
sending self-generated OSPF packets to the plurality of OSPF areas; and
filtering of the received OSPF packets such that received Link State Advertisement (LSA) packets from an OSPF area are not forwarded to other OSPF areas.

2. The non-transitory computer-readable medium of claim 1, wherein the plurality of OSPF areas each have an arbitrarily selected OSPF area identifier, including where two of the OSPF areas have a same OSPF area identifier.

3. The non-transitory computer-readable medium of claim 1, wherein, for Database Description (DD) packets, only self-generated LSAs are attached thereto.

4. The non-transitory computer-readable medium of claim 1, wherein the filtering includes preventing flooding except for LSA packets that need to be flooded back out a receiving interface.

5. The non-transitory computer-readable medium of claim 1, wherein the steps include
communicating to a router connected to a data communication network; and
communicating to a management plane via a plurality of interfaces each connected to an associated area of the plurality of OSPF areas.

6. The non-transitory computer-readable medium of claim 5, wherein the management plane is associated with a network that includes a plurality of network elements.

7. The non-transitory computer-readable medium of claim 5, wherein the communicating to the router is via Border Gateway Protocol (BGP) for communication to a Network Management System (NMS).

8. The non-transitory computer-readable medium of claim 5, wherein the communicating to the management plane is via any of an Optical Service Channel (OSC), the data communications network, and via an Internal Local Area Network (ILAN) interface associated with the network element.

9. The non-transitory computer-readable medium of claim 5, wherein the network element is a Reconfigurable Optical Add/Drop Multiplexer (ROADM).

10. The non-transitory computer-readable medium of claim 9, wherein the plurality of OSPF areas include a local domain at a site where the ROADM is configured and a domain on an Optical Multiplex Section (OMS) connected to a degree associated with the ROADM, and wherein a network element on the local domain is unreachable to another network element on the domain on the OMS.

11. A controller comprising:
at least one processor and memory comprising instructions, when executed on the at least one processor, cause the at least one processor to
receive Open Shortest Path First (OSPF) packets from a plurality of OSPF areas,
send self-generated OSPF packets to the plurality of OSPF areas, and
filter the received OSPF packets such that received Link State Advertisement (LSA) packets from an OSPF area are not forwarded to other OSPF areas.

12. The controller of claim 11, wherein the plurality of OSPF areas each have an arbitrarily selected OSPF area identifier, including where two of the OSPF areas have a same OSPF area identifier.

13. The controller of claim 11, wherein, for Database Description (DD) packets, only self-generated LSAs are attached thereto.

14. The controller of claim 11, wherein the filtering includes preventing flooding except for LSA packets that need to be flooded back out a receiving interface.

15. The controller of claim 11, wherein the instructions further cause the at least one processor to
communicate to a router connected to a data communication network, and
communicate to a management plane via a plurality of interfaces each connected to an associated area of the plurality of OSPF areas.

16. A method comprising:
receiving Open Shortest Path First (OSPF) packets from a plurality of OSPF areas;
sending self-generated OSPF packets to the plurality of OSPF areas; and
filtering of the received OSPF packets such that received Link State Advertisement (LSA) packets from an OSPF area are not forwarded to other OSPF areas.

17. The method of claim 16, wherein the plurality of OSPF areas each have an arbitrarily selected OSPF area identifier, including where two of the OSPF areas have a same OSPF area identifier.

18. The method of claim 16, wherein, for Database Description (DD) packets, only self-generated LSAs are attached thereto.

19. The method of claim 16, wherein the filtering includes preventing flooding except for LSA packets that need to be flooded back out a receiving interface.

20. The method of claim 16, further comprising
communicating to a router connected to a data communication network; and
communicating to a management plane via a plurality of interfaces each connected to an associated area of the plurality of OSPF areas.

* * * * *